(12) United States Patent
Damnjanovic et al.

(10) Patent No.: US 10,154,463 B2
(45) Date of Patent: Dec. 11, 2018

(54) METHOD AND APPARATUS FOR UPLINK POWER CONTROL IN A MULTICARRIER WIRELESS COMMUNICATION SYSTEM

(71) Applicant: QUALCOMM Incorporated, San Diego, CA (US)

(72) Inventors: Jelena Damnjanovic, Del Mar, CA (US); Juan Montojo, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/444,210

(22) Filed: Feb. 27, 2017

(65) Prior Publication Data

US 2017/0171826 A1    Jun. 15, 2017

Related U.S. Application Data

(62) Division of application No. 12/772,902, filed on May 3, 2010, now Pat. No. 9,585,108.
(Continued)

(51) Int. Cl.
| | | |
|---|---|---|
| *H04B 7/00* | (2006.01) |
| *H04W 52/14* | (2009.01) |
| *H04W 52/32* | (2009.01) |
| *H04W 52/34* | (2009.01) |
| *H04W 52/26* | (2009.01) |
| *H04W 52/24* | (2009.01) |
| *H04W 84/04* | (2009.01) |

(52) U.S. Cl.
CPC ....... *H04W 52/146* (2013.01); *H04W 52/242* (2013.01); *H04W 52/265* (2013.01); *H04W 52/325* (2013.01); *H04W 52/343* (2013.01); *H04W 52/346* (2013.01); *H04W 84/042* (2013.01)

(58) Field of Classification Search
CPC . H04W 52/146; H04W 52/04; H04W 52/242; H04W 52/265; H04W 52/325
USPC .......................................... 455/69, 522, 453
See application file for complete search history.

(56) References Cited

U.S. PATENT DOCUMENTS

| | | |
|---|---|---|
| 7,027,829 B1 | 4/2006 | Laakso et al. |
| 8,150,443 B2 | 4/2012 | Pedersen et al. |
| (Continued) | | |

FOREIGN PATENT DOCUMENTS

| | | |
|---|---|---|
| CN | 1836392 A | 9/2006 |
| EP | 1367739 A1 | 12/2003 |
| (Continued) | | |

OTHER PUBLICATIONS

Classon B, "3GPP_TSG_RAN_WG1 Archives," Apr. 2009, week 4: Huawei LTE and LTE-A contributions for RAN1#57 plus three joint contributions, Apr. 27, 2009, 10 pgs., URL, http://list.etsi.org/scripts/wa.exe?A2=ind0904d&L=3gpp_tsg_ran_wg1&T=0&O=D&P=7828.

(Continued)

*Primary Examiner* — Tu X Nguyen
(74) *Attorney, Agent, or Firm* — Holland & Hart LLP

(57) ABSTRACT

The described apparatus and methods may include a controller configured to determine power required for at least one of a plurality of carriers, and generate at least one of a plurality of power control commands for at least one of the plurality of carriers based on the determination.

30 Claims, 11 Drawing Sheets

Related U.S. Application Data

(60) Provisional application No. 61/175,405, filed on May 4, 2009.

(56) References Cited

U.S. PATENT DOCUMENTS

| | | | |
|---|---|---|---|
| 9,585,108 | B2 | 2/2017 | Damnjanovic et al. |
| 2005/0135312 | A1 | 6/2005 | Montojo et al. |
| 2006/0203724 | A1 | 9/2006 | Ghosh et al. |
| 2006/0270431 | A1 | 11/2006 | Yoshi et al. |
| 2008/0037413 | A1 | 2/2008 | Gu et al. |
| 2008/0280638 | A1 | 11/2008 | Malladi et al. |
| 2010/0273515 | A1 | 10/2010 | Fabien et al. |
| 2011/0038271 | A1* | 2/2011 | Shin .................... H04W 52/146 370/252 |

FOREIGN PATENT DOCUMENTS

| | | |
|---|---|---|
| EP | 1655868 A1 | 5/2006 |
| EP | 2397005 A2 | 12/2011 |
| KR | 20060132786 A | 12/2006 |
| KR | 20080014421 A | 2/2008 |
| RU | 2007137009 A | 4/2009 |
| WO | WO-2006096789 A1 | 9/2006 |
| WO | WO-2008105273 A1 | 9/2008 |
| WO | WO-2009040636 A1 | 4/2009 |
| WO | WO-2009048404 A1 | 4/2009 |
| WO | WO-2010091425 A2 | 8/2010 |

OTHER PUBLICATIONS

Ericsson, "DC-HSUPA Power Scaling," 3GPP TSG RAN WG1 Meeting #57, R1-091894, San Francisco, USA, May 4-8, 2009, 6 pgs., XP05033938528, 3rd Generation Partnership Project.

Golitschek A., "3GPP_TSG_RAN_WG1 Archives," Apr. 2009, week 4: Panasonic LTE-A contributions for RAN1 57 (batch 2/2), Apr. 27, 2009, 3 pgs., URL, http://list.etsi.org/scripts/wa.exe?A2=ind0904d&L=3gpp_tsg_ran_wg1&T=0&O=D&P=5100.

Huawei, "PUCCH Design for Carrier Aggregation," 3GPP TSG RAN WG1 Meeting #57, R1-091810, San Francisco, USA, May 4-8, 2009, 8 pgs., XP050339324, 3rd Generation Partnership Project.

ISA/EP, International Search Report and Written Opinion of the International Searching Authority, Int'l Application No. PCT/US2010/033631, dated Aug. 3, 2010, European Patent Office, Rijswijk, NL, 16 pgs.

Larsson N.D., "3GPP_TSG_RAN_WG1 Archives" Apr. 2009, week 4: [LTE rel-9] Ericsson contributions to ran1 #57, Apr. 27, 2009, 6 pgs., URL, http://list.etsi.org/scripts/wa.exe?A2=ind0904d&L=3gpp_tsg_ran_wg1&T=0& O=D&P=14072.

Nomor Research GmbH, "White Paper—Dual Cell HSDPA and its Future Evolution," Jan. 2009 (Jan. 31, 2009) pp. 1-5.

Panasonic, "PDCCH Design for Carrier Aggregation," 3GPP TSG-RAN WG1 Meeting #57, R1-091743, San Francisco, USA, May 4-8, 2009, 9 pgs., 3rd Generation Partnership Project.

Panasonic, "System Performance of Uplink Non-Contiguous Resource Allocation," 3GPP TSG RAN WG1 Meeting #55, R1-084224, Prague, Czech Republic, Nov. 10-14, 2008, 5 pgs., 3rd Generation Partnership Project.

TIPO, Supplementary Taiwan Search Report, TW App. No. TW099114302, dated Jul. 9, 2013, Taiwan Patent Office, 1 pg.

ZTE, "Asymmetric band aggregation and anchor carrier," 3GPP TSG-RAN WG1 Meeting #57, R1-091701, San Francisco, USA, May 4-8, 2009, 3 pgs., 3rd Generation Partnership Project.

* cited by examiner

METHOD AND APPARATUS FOR UPLINK POWER CONTROL IN A MULTICARRIER WIRELESS COMMUNICATION SYSTEM

CLAIM OF PRIORITY UNDER 35 U.S.C. §119

The present Application is a divisional of U.S. patent application Ser. No. 12/772,902, entitled "METHOD AND APPARATUS FOR UPLINK POWER CONTROL IN A MULTICARRIER WIRELESS COMMUNICATION SYSTEM" filed May 3, 2010 and claims priority to Provisional Application No. 61/175,405 entitled "UPLINK POWER CONTROL IN MULTICARRIER OPERATION" filed May 4, 2009, and assigned to the assignee hereof and hereby expressly incorporated by reference herein.

BACKGROUND

Field

The present disclosure relates generally to wireless communication systems. More specifically, the present disclosure relates to a method and apparatus for uplink power control in a multicarrier wireless communication system.

Introduction

Wireless communication systems are widely deployed to provide various communication services such as voice, video, packet data, messaging, broadcast, etc. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3GPP Long Term Evolution (LTE) systems, orthogonal Frequency Division Multiple Access (OFDMA) systems, and Single-Carrier FDMA (SC-FDMA) systems.

In communication systems where multiple uplink and downlink carriers are present, certain rules should be defined specifying power control for multiple uplink carriers. While in LTE Release 8 there may be only one uplink paired with one downlink, and the uplink power control is configured for controlling transmit power of the channels on the one uplink carrier, such a solution is inapplicable to multicarrier systems (e.g., LTE-Advanced) having multiple uplink and downlink carrier configurations.

Accordingly, there exists a need m the art for a method and apparatus that provide uplink control for multiple uplinks in multicarrier systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect of the disclosure, a wireless communication apparatus may include a controller configured to determine power required for at least one of a plurality of carriers, and generate at least one of a plurality of power control commands for at least one of the plurality of carriers based on the determination.

According to another aspect of the disclosure, a method for wireless communication may include determining power required for at least one of a plurality of carriers, and generating at least one of a plurality of power control commands for at least one of the plurality of carriers based on the determination.

According to a further aspect of the disclosure, an apparatus may include means for determining power required for at least one of a plurality of carriers, and means for generating at least one of a plurality of power control commands for at least one of the plurality of carriers based on the determination.

According to yet a further aspect of the disclosure, a computer program product may include a computer-readable medium including code for determining power required for at least one of a plurality of carriers, and code for generating at least one of a plurality of power control commands for at least one of the plurality of carriers based on the determination.

According to yet a further aspect of the disclosure, a wireless communication apparatus may include a controller configured to decode power control commands for at least one of a plurality of carriers, and distribute power among the at least one of the plurality of carriers based on the power control commands.

According to yet a further aspect of the disclosure, a method for wireless communication may include decoding power control commands for at least one of a plurality of carriers, and distributing power among the at least one of the plurality of carriers based on the power control commands.

According to yet a further aspect of the disclosure, an apparatus may include means for decoding power control commands for at least one of a plurality of carriers, and means for distributing power among the at least one of the plurality of carriers based on the power control commands.

According to yet a further aspect of the disclosure, a computer program product may include a computer-readable medium including code for decoding power control commands for at least one of a plurality of carriers, and code for distributing power among the at least one of the plurality of carriers based on the power control commands.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
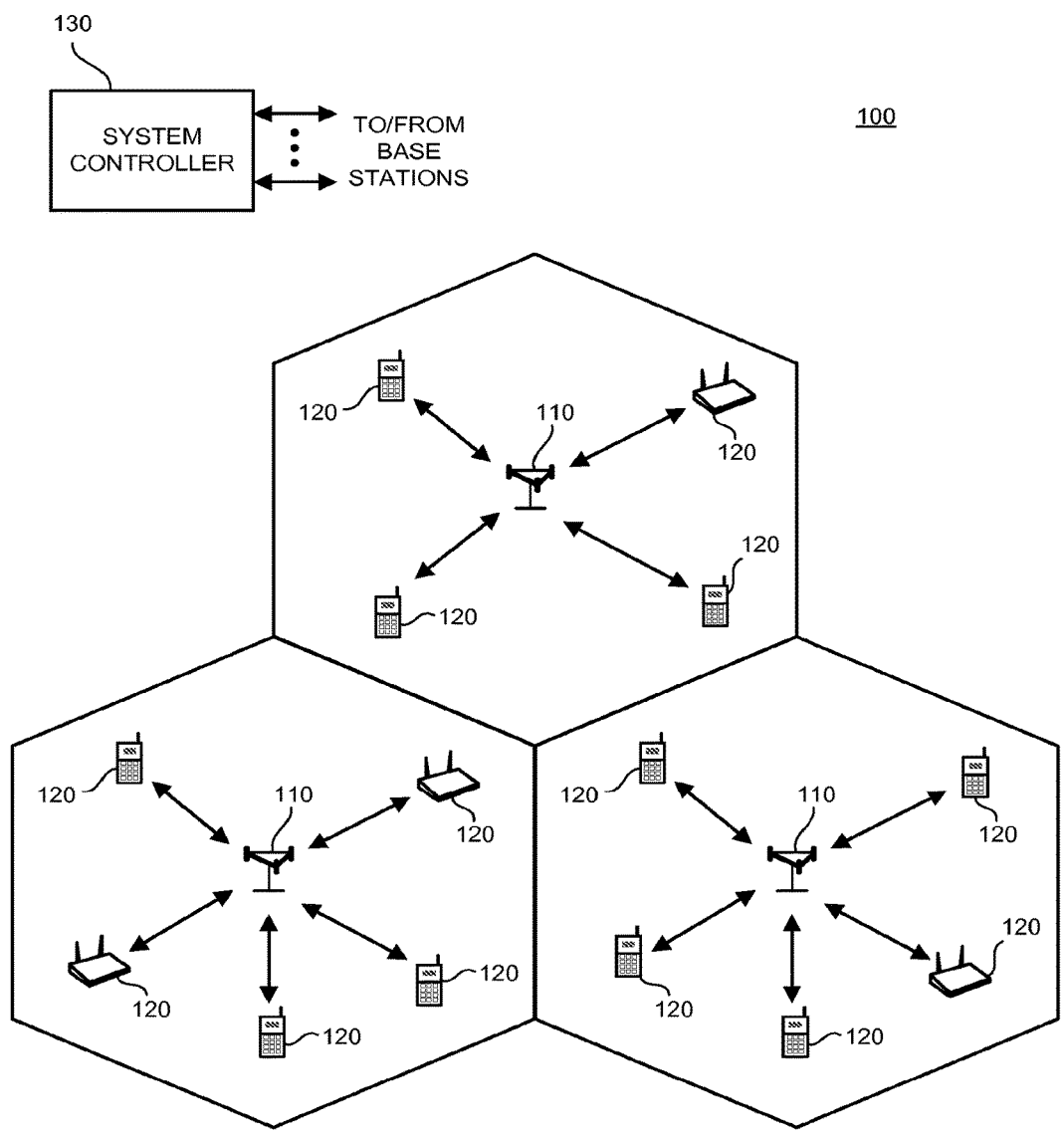
FIG. 1 illustrates aspects of a wireless communication system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution.

For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TOMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TOMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented m terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

FIG. 1 shows a wireless communication system 100, which may be a 3GPP LTE E-UTRA system. System 100 may include base stations 110 and other network entities described by 3GPP. A base station may be a fixed station that communicates with the access terminals. Each base station 110 may provide communication coverage for a particular geographic area. To improve network capacity, the overall coverage area of a base station may be partitioned into multiple (e.g., three) smaller areas. Each smaller area may be served by a respective base station subsystem. In 3GPP, the term "cell" can refer to the smallest coverage area of a base station and/or a base station subsystem serving this coverage area.

A system controller 130 may include a mobility management entity (MME) and a serving gateway (S-GW), and may couple to a set of base stations and provide coordination and control for these base stations. S-GW may support data services such as packet data, Voice-over-Internet Protocol (VoIP), video, messaging, etc. MME may be responsible for path switching between a source base station and a target base station at handover. System controller 130 may couple to a core and/or data network (e.g., the Internet) and may communicate with other entities (e.g., remote servers and terminals) coupled to the core/data network.

Access terminals 120 may be dispersed throughout the network, and each access terminal may be stationary or mobile. An access terminal may communicate with a base station via downlink and uplink. The downlink (or forward link) refers to the communication link from the base station to the access terminal, and the uplink (or reverse link) refers to the communication link from the access terminal to the base station. In FIG. 1, a solid line with double arrows indicates active communication between a base station and an access terminal.

Figure 2:
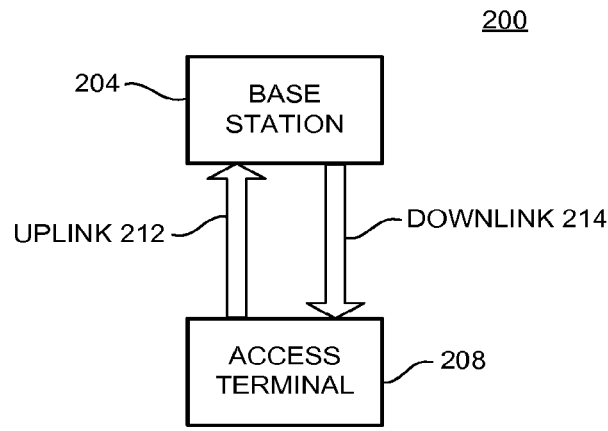
FIG. 2 illustrates a communications system including an uplink and a downlink between a base station and an access terminal.

FIG. 2 illustrates a system 200 including an uplink 212 and a downlink 214 between a base station 204 and an access terminal 208. The base station 204 and the access terminal 208 may correspond to the base station 110 and the access terminal 120 shown in FIG. 1. The uplink 212 refers to transmissions from the access terminal 208 to the base station 204; and the downlink 214 refers to transmissions from the base station 204 to the access terminal 208.

Figure 3:
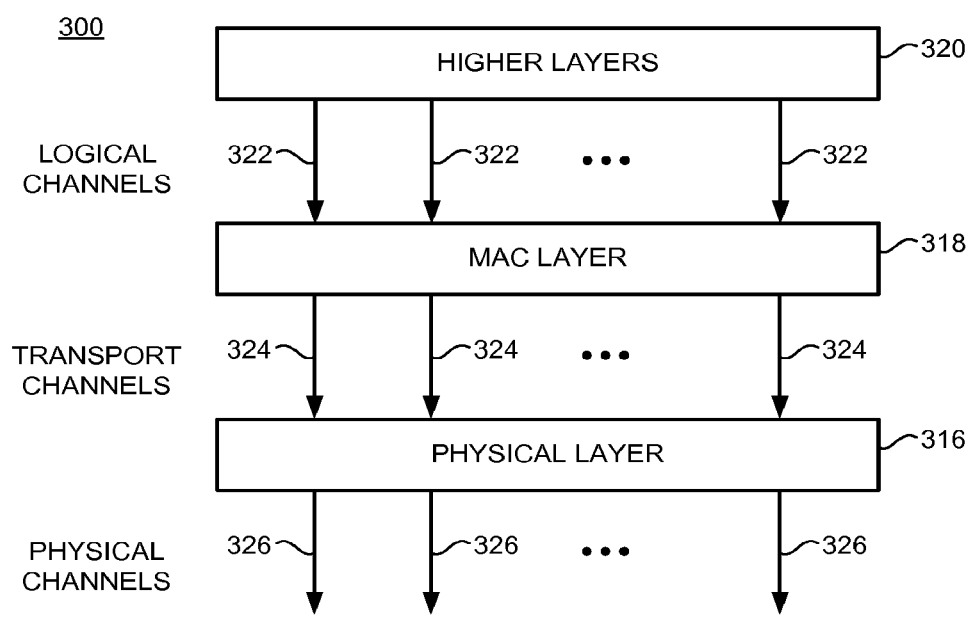
FIG. 3 illustrates some aspects of a protocol stack for a communications system.

FIG. 3 illustrates some aspects of a protocol stack for a communications system. Both, the base station 204 and the access terminal 208 may include the protocol stack 300 illustrated in FIG. 3. The protocol stack may include a physical layer (PHY) 316, a Medium Access Control (MAC) 318, and higher layers 320.

The MAC layer 318 may receives data from the higher layers 320 via one or more logical channels 322. The MAC layer 318 may then perform various functions such as mapping between logical channels 322 and transport channels 324, multiplexing and demultiplexing of various PDUs for logical channels 322 into/from transport blocks for transport channels 324, error correction, traffic volume measurement reporting, priority handling between logical channels 322 of an access terminal, priority handling between access terminals via dynamic scheduling, transport format selection, padding, etc.

The physical layer 316 may be configured to provide multiple physical control channels 326. The access terminal 204 may be configured to monitor this set of control channels. The physical layer 316 may also offer data transport services via the physical channels 326. Some the physical channels for downlink signal transmissions may be Physical Downlink Control Channel (PDCCH), Physical Hybrid ARQ Indicator Channel (PHICH), and Physical Downlink Shared Channel (PDSCH). Some of the physical channels for uplink signal transmissions may be Physical Uplink Control Channel (PUCCH), Physical Uplink Shared Channel (PUSCH), and Physical Random Access Channel (PRACH).

Figure 4:
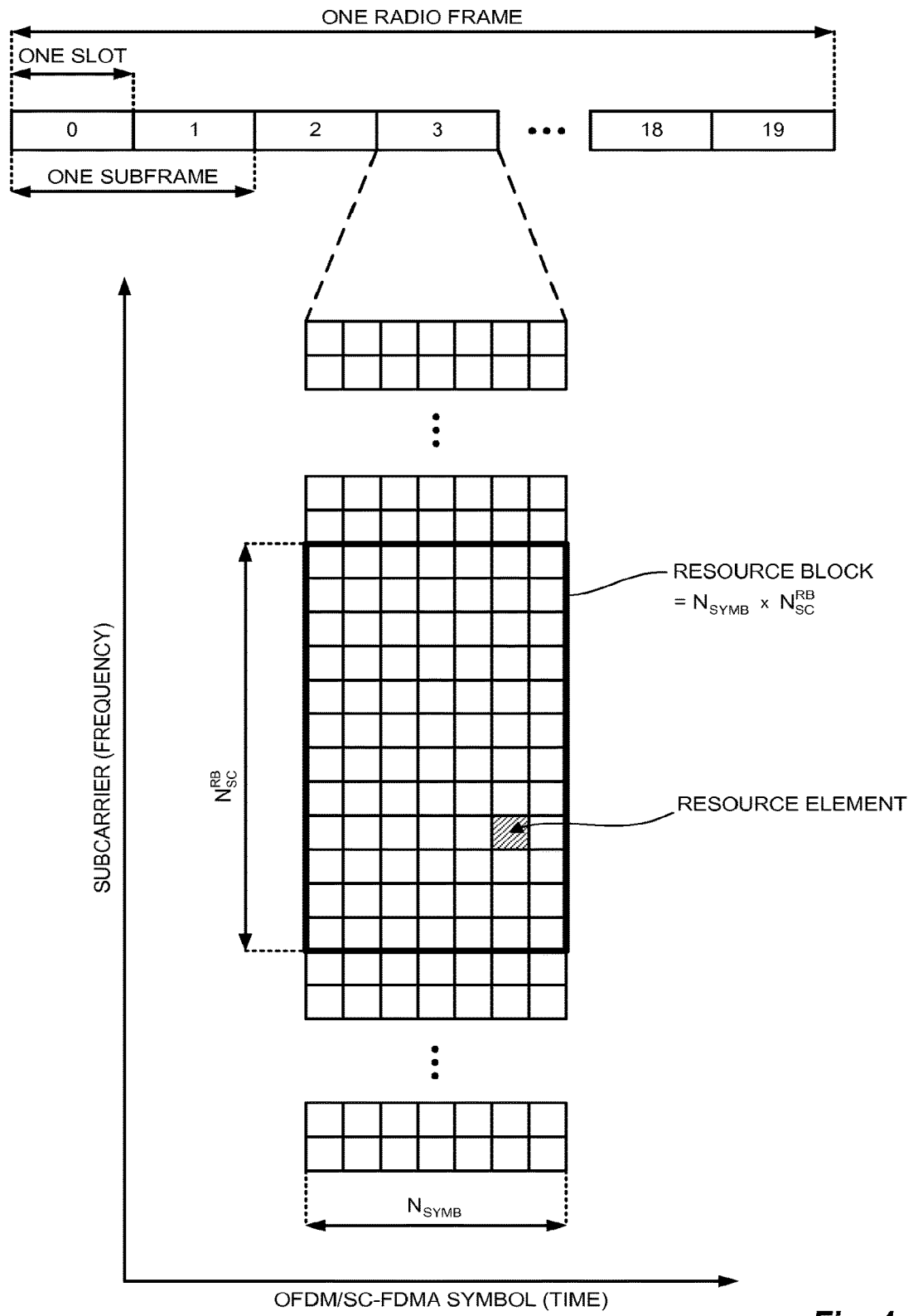
FIG. 4 illustrates a radio frame structure and a resource grid showing a resource block and resource elements.

The system 100 may use orthogonal OFDMA for the downlink and SC-FDMA for the uplink. The basic idea underlying OFDM is the division of the available frequency spectrum into several subcarriers. To obtain a high spectral efficiency, the frequency responses of the subcarriers are overlapping and orthogonal. In the system 100, the OFDMA downlink transmissions and the uplink transmissions may be organized into radio frames with a 10 ms duration. The frame structure may be applicable to both frequency division duplex (FDD) (the application of frequency-division multiplexing to separate outward and return signals) and time division duplex (TDD) (the application of time-division multiplexing to separate outward and return signals). As shown in FIG. 4, each radio frame is 10 ms long and consists of 20 slots of 0.5 ms, numbered from 0 to 19. A subframe is defined as two consecutive slots where subframe i consists of slots $2i$ and $2i+1$. The subframe may be referred to as a transmission time interval (TTI). For FDD, 10 subframes are available for downlink transmission and 10 subframes are available for uplink transmissions in each 10 ms interval. Uplink and downlink transmissions are separated in the frequency domain. For TDD, a subframe is either allocated to downlink or uplink transmission. Subframe 0 and subframe 5 may always be allocated for downlink transmission.

The signal in each slot may be described by a resource grid of $N_{SC}^{RB}$ subcarriers and $N_{SYMB}$ symbols, which may be OFDM symbols for downlink or SC-FDMA symbols for uplink. In case of multi-antenna transmission from the base station 110, there may be one resource grid defined per antenna port. An antenna port may be defined by a downlink reference signal (DLRS) that is unique within the cell. Each element in the resource grid for an antenna port p may be called a resource element and is uniquely identified by the index pair (k,l) where k and l are the indices in the frequency and time domains, respectively. One, two, four, or more antenna ports may be supported. A physical resource block may be defined as $N_{SYMB}$ consecutive symbols in the time domain and $N_{SC}^{RB}$ (e.g., 12) consecutive subcarriers in the frequency domain. A resource block thus consists of $N_{SYMB} \times N_{SC}^{RB}$ resource elements.

Data transmitted over the system 100 may be categorized as either non-real-time (NRT) data or real-time (RT) data. Examples of NRT data include data transmitted during web browsing by an access terminal or text-messaging to an access terminal, while an example of RT data is voice communication between access terminals.

Data packets (both NRT and RT) are transmitted from the base station to the access terminals in the PDSCH. Various modulation and coding schemes (MCSs) are supported on the PDSCH. Modulation schemes include quadrature phase-shift keying (QPSK) and quadrature amplitude modulation (QAM), such as 16-QAM and 64-QAM. Various coding rates, used for error correction, may be used. The combination of modulation schemes and coding rates may result in a large number, e.g., 30, of possible MCSs.

In LTE based systems (e.g., 3GPP Release 8), uplink power control can be a combination of open loop power control and closed loop power control. With open loop power control, access terminal estimates downlink path loss to facilitate power control. With closed loop, the base station can explicitly control uplink transmit power via power control commands. Transmission and power control signaling in the absence of uplink data may take place on the PUCCH; and control signaling in the presence of uplink data may take place on the PUSCH.

Figure 5:
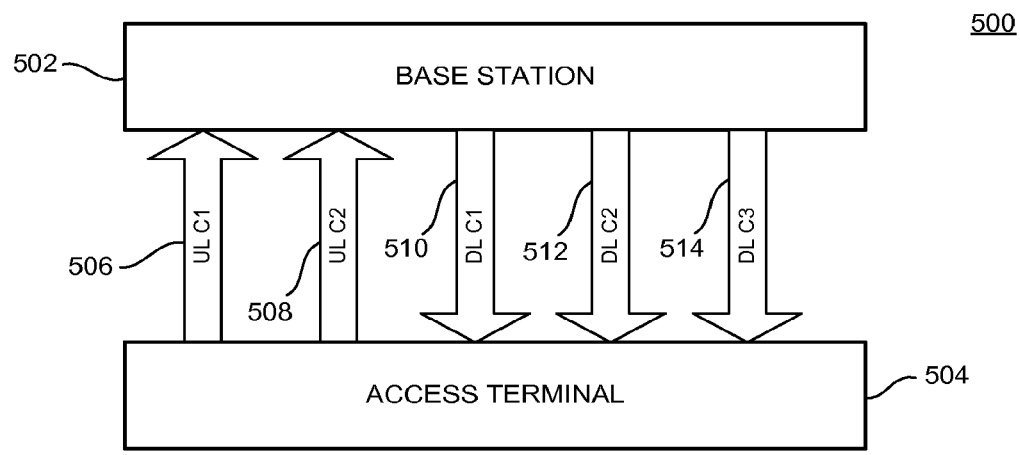
FIG. 5 illustrates an example of a multicarrier system that facilitates uplink power control in a wireless communication environment.

FIG. 5 is an example of a multicarrier system that facilitates uplink power control in a wireless communication environment. As shown in FIG. 5, multicarrier system 500 may include uplink carriers UL C1 506, UL C2 508 and downlink carriers DL C1 510, DL C2 512, DL C3 514 between a base station 502 and an access terminal 504. The base station 502 and the access terminal 504 may correspond to the base station 110 and the access terminal 120 shown in FIG. 1. The system 500 is shown to be asymmetric in the sense that the number of uplink carriers 506, 508 is not equal to the number of downlink carriers 510, 512, 514. Although only two uplink carriers and three downlink carriers are shown, the system 500 may be configured to include any number of uplink and downlink carriers. The system 500 may also be a symmetric system having an equal number uplink and downlink carriers.

The system 500 is further configured to support carrier pairing between the uplink and downlink carriers. The pairing can be between one or more downlink carriers and one or more uplink carriers. In one configuration, at least one downlink carrier is paired with a plurality of uplink carriers or a plurality of downlink carriers are paired with at least one uplink carrier, such that the pairing group of downlink and uplink carriers contains at least three carriers.

The system 500 man include any number of disparate base stations similar to the base station 502 and/or any number of disparate access terminals similar to access terminal 504. According to an illustration, system 500 can be a LTE-A based system; however, the claimed subject matter is not so limited.

To facilitate multicarrier operations, system 500 can provide power control on a per carrier basis. Per carrier power control enables operations in separate frequency bands as well flexibility for interference management purposes.

In an aspect, access terminal 504 may determine transmit power for data transmission on PUSCH. According to an example, transmission power $P_{PUSCH}(i,k)$, in dBm, for a plurality of carriers indicated by carrier index k, in subframe i, can be determined by the following Equation 1:

$$P_{PUSCH}(i,k)=\min\{P_{MAX}, 10 \log_{10}(M_{PUSCH}(i,k))+P_{O\_PUSCH}(j,k)+a(j,k)\cdot PL(k)+\Delta_{TF}(i,k)+f(i,k)\}$$

Pursuant to this illustration, all components are defined per uplink carrier, as specified by carrier index k. In Equation 1, $P_{MAX}$ is a maximum allowed transmission power, as configured in higher layers (e.g., in system information blocks (SIB)). $M_{PUSCH}(i,k)$ is the bandwidth of a PUSCH resource assignment expressed in a number of resource blocks valid for subframe i. $P_{O\_PUSCH}(j,k)$ is a parameter configured by the sum of 8-bit cell specific nominal component and a 4-bit access terminal specific component, and is provided by higher layers for both j=0 and j=1. a(j,k) is a 3-bit cell specific parameter provided by a higher layer that weighs the effect of path loss estimates in power control decisions. PL(k) is a downlink path loss estimate calculated in the access terminal. In one example, the path loss estimate is based upon a difference between a reference signal power as provided by higher layers and a higher layer filtered reference signal received power. $\Delta_{TF}(i,k)$ is a power offset particular to a specific transport format of information and/or a specific modulation and coding scheme. $\Delta_{TF}(i,k)$ can be provided by $10 \log_{10}(2^{(MPR)(Ks)}-1)$, where Ks is given by deltaMCS-Enabled, a parameter specific to an access terminal provided by higher layers, and where MPR=TBS/$N_{RE}$, TBS being the transport block size and $N_{RE}$ being a number of resource elements. The parameter f(i,k) is a power control adjustment state as provided by the base station and is determined by $\delta_{PUCCH}$, an access terminal correction value referred to as a Transmission Power Control (TPC) command. $\delta_{PUCCH}$ is the TPC information transmitted from the base station to the access terminal via the PDCCH or the PDSCH.

In an aspect, access terminal 504 may also determine transmit power for data transmission on PUCCH. According to an example, the transmission power $P_{PUCCH}(i,k)$ of a signal transmitted through uplink via the PUCCH in the subframe i for a plurality of earners, as indicated by the carrier index k, may be determined by the following Equation 2:

$$P_{PUSCH}(i,k)=\min\{P_{MAX}, P_{O\_PUCCH,k}+PL(k)+h(n_{CQI},n_{HARQ},k)+\Delta_{F\_PUCCH}(TF,k)+g(i,k)\}$$

Pursuant to this illustration, all components are defined per unit carrier, as specified by carrier index k. $\Delta_{F\_PUCCH}(TF, k)$ with respect to each PUCCH transport format (TF) is provided by an RRC. $P_{O\_PUCCH,k}$ is a parameter configured by the sum of a 5-bit cell specific parameter provided by a higher layer and an access terminal specific component given by the RRC. is a factor determined by $\delta_{PUCCH}$, also a TPC command. $\delta_{PUCCH}$ is TPC information transmitted from the base station to the access terminal via the PDCCH or the PDSCH.

Power control commands (e.g., TPC) can be generated and signaled by the base station 502. Power control commands for PUSCH may be included in uplink grants, while power control commands for PUCCH may be conveyed in downlink grants. In addition, the base station 502 can convey power control commands for a group of access terminals utilizing Downlink Control Information (DCI). DCI formats 3 and 3A may be used for PUCCH and PUSCH with 2-bit or 1-bit power adjustments for each carrier, respectively. In the multicarrier system 500, multicarrier uplink and/or downlink grants may carry access terminal TPC commands for all configured access terminals, and may be transmitted by the base station 502 on any downlink carrier. The access terminal 504 may monitor one or a multitude of downlink carriers (e.g., anchor carrier) for the multicarrier grants. The base station 502 may use Radio Resource Control (RRC) signaling to inform the access terminal 504 which downlink carriers to monitor for possible grants.

Figure 6:
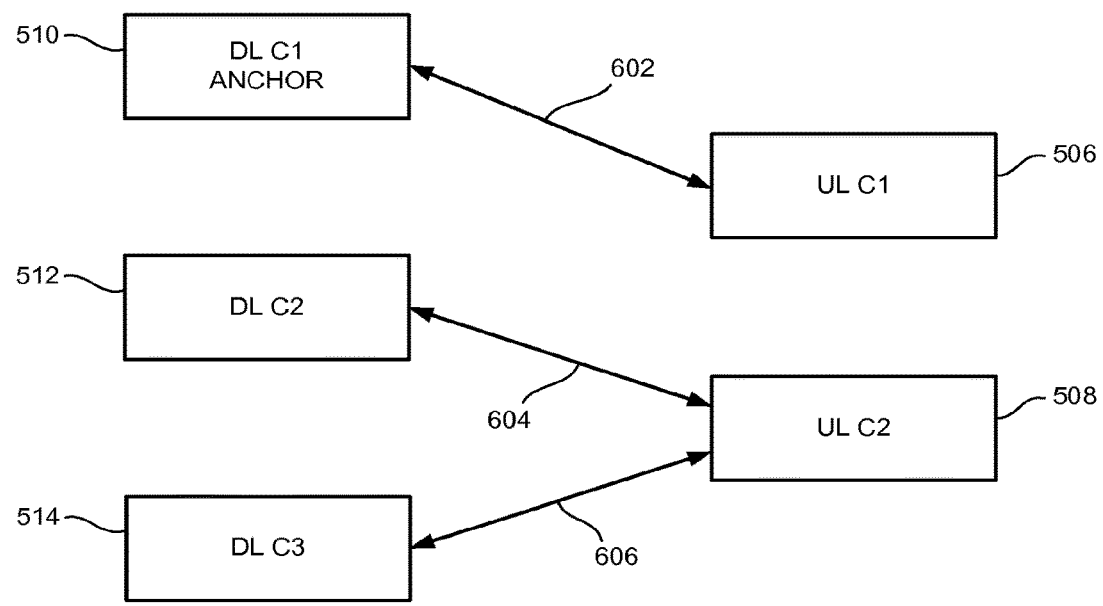
FIG. 6 illustrates an example of uplink/downlink pairing with an anchor carrier.

FIG. 6 shows is a block diagram illustrating an example of downlink/uplink carrier pairing for the system 500. As shown in FIG. 6, UL C1 506 may be paired with DL C1 510 (shown with solid arrow 602), and UL C2 508 may be paired with DL C2 512 and DL C3 514 (shown with solid arrows 604, 606). UL C1 506 may receive uplink control information for DL C1 510, and UL C2 508 may receive uplink control information for DL C2 512 and DL C3 514. The uplink control information may include downlink Hybrid Automatic Repeat Request (HARQ) feedback and Channel Quality Indicator (CQI) feedback. Similarly, the DL C1 may receive downlink control information for UL C1 506, and DL C2 512 and DL C3 514 may receive downlink control information for UL C2 508. The downlink control information may include uplink grants, downlink grants, as well as uplink HARQ feedback.

Carrier pairing can be semi-static or dynamic as determined by the base station 502. For semi-static pairing, the base station 502 can notify all the access terminals 504, 120 of the pairing by broadcasting the system information in a SIB. Alternatively, the base station 502 can inform each access terminal 504, 120 of the pairing with a dedicated signaling through RRC signaling in an RRC connection setup message. For dynamic pairing, the base station 110 can notify the access terminals 120 of the pairing through MAC signaling included in the grant message.

The carrier on which control information is sent may also depend on whether there are any designated anchor carriers. If an anchor carrier is present in the system, control information may be sent on the anchor carrier for one or more of the corresponding carriers, even if the carriers are outside the pairing. For example, if DL C1 510 may be designated as the anchor carrier for the downlink carriers 510, 512, 514, and UL C1 506 may be designated as the anchor carrier for the uplink carriers 506, 508, then UL C1 506 would receive control information for downlink carriers 510, 512, 514, and DL C1 510 would receive control information for uplink carriers 506, 508.

One or more anchor carriers can be defined for each of the uplink carriers and the downlink carriers. The base station 502 may notify the access terminals 504, 120 of an anchor carrier in an SIB or through a dedicated signaling such as RRC signaling. The base station 502 notifies access terminals 504, 120 of the uplink/downlink pairing and any anchor carriers in SIBs. The SIBs may include carrier locations (i.e., carrier center frequencies), carrier bandwidths, carrier designation (uplink/downlink), carrier pairing, and anchor carrier information, as well as on which specific carrier and resources to expect uplink/downlink grants carrying TPC commands. In one configuration, some of the control information may be sent through the anchor carrier and other control information may be sent through the paired carrier. For example, the base station 110 could indicate with a flag through a broadcast or RRC signaling whether the uplink TPC command will be sent on a paired downlink carrier or the designated downlink anchor carrier.

Base station 502 may also analyze a power headroom report provided by access terminal 504. The power headroom report indicates a difference between maximum transmission power available to the access terminal 504 and a transmission power that would be utilized for a carrier (or a total of all carriers). In this manner, the base station 502 may estimate the power limitations of the access terminal 504. The base station 502 may also facilitate generation of power control commands and/or facilitate scheduling decisions. For instance, the base station 502 may identify situations where the access terminal 504 should not be scheduled on multiple carriers when the access terminal 504 cannot support the carriers.

In another aspect, the base station 502 can employ overload indicators. An overload indicator per carrier provides better control in cases when carriers are not uniformly loaded and shared. For example, in case of an asymmetric carrier configuration, as illustrated in the system 500, whether one or a plurality of downlink carriers may carry the overload indicator depends on they type of carrier asymmetry. If the number of uplink carriers is greater than the number of downlink carriers, then only one downlink carrier would carry the overload indicator for the corresponding uplink carriers based on the uplink/downlink carrier pairing. If on the other hand, the number of uplink carriers is less than the number of downlink carriers, more than one downlink carrier could carry the overload indicator for the corresponding uplink based on the uplink/downlink pairing. Overload indicators may also be transmitted on anchor carriers regardless of the uplink/downlink carrier pairing.

In another aspect, access terminal 504 may facilitate configuration of uplink transmission power for each uplink carrier. In one example, the access terminal 504 may distribute power over multiple carriers. For instance, the access terminal 504 may prioritize carriers such that necessary power is provided according to importance of carriers. In one example, anchor carriers may have higher priority than other carriers, and thus, may receive required power first. In another example, uplink carriers carrying the highest priority data may have higher priority than other carriers, and thus, may receive required power first. Alternatively, a prioritization list indicating carrier priority may be conveyed to the access terminal 504 by the base station 502. The access terminal 504 may also uniformly scale power across the carriers. Further, the base station 502 and/or the access terminal 504 may be configured to fulfill PUCCH power requirements before PUSCH power requirements, on any given carrier. If, however, control information or upper layer signaling is transmitted on a PUSCH of a high priority carrier, the base station 502 and/or the access terminal 504 will accommodate such PUSCH power requirements on the high priority carrier before the PUCCH power requirements of carriers with lower priority.

Figure 7:
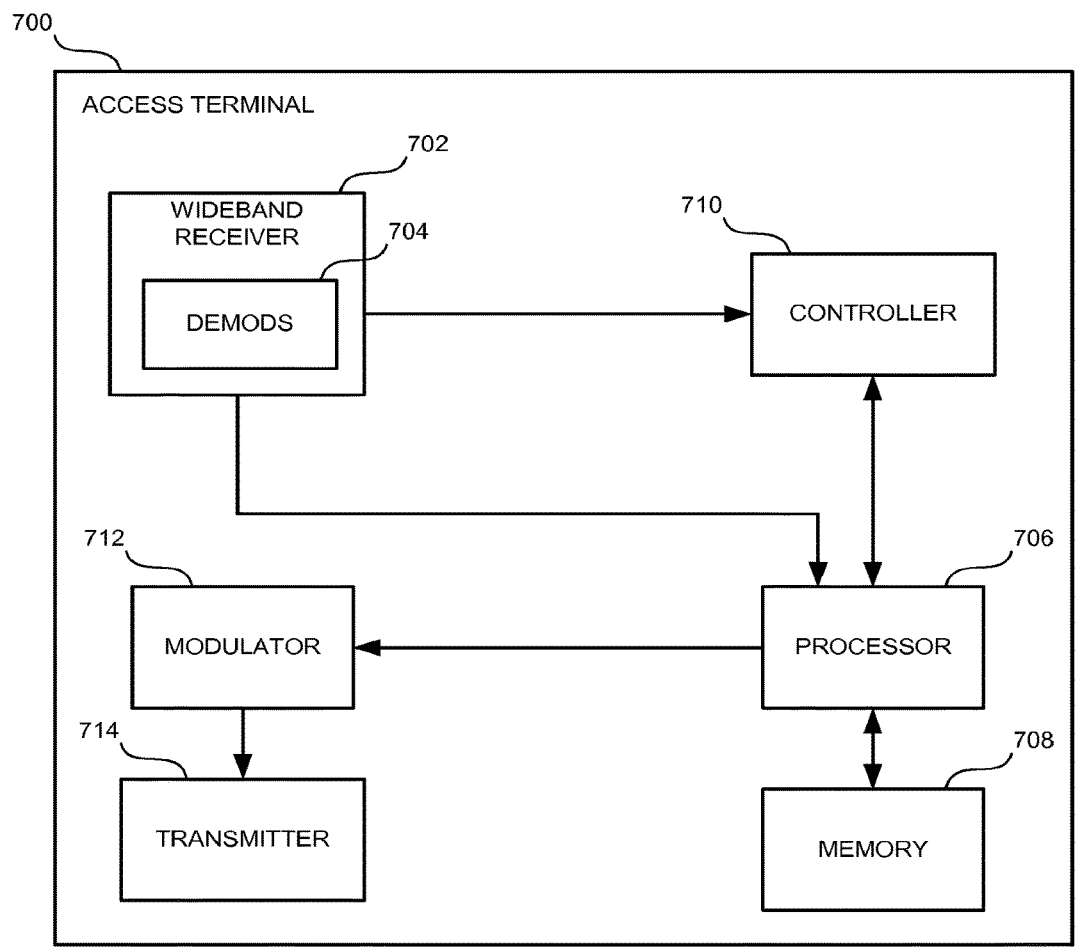
FIG. 7 illustrates an example of an access terminal that facilitates uplink power control in a multicarrier communications system.

FIG. 7 is an illustration of an access terminal that facilitates uplink power control in a multicarrier communications system. The access terminal 700 may correspond to the one of the access terminals 120 shown in FIG. 1. As shown in FIG. 7, the access terminal 700 may include a receiver 702 that receives multiple signals from, for instance, one or more receive antennas (not shown), performs typical actions on (e.g., filters, amplifies, downconverts, etc.) the received signals, and digitizes the conditioned signals to obtain samples. The receiver 702 may include a plurality of demodulators 704 that can demodulate received symbols from each signal and provide them to a processor 706 for channel estimation, as described herein. The processor 706 can be a processor dedicated to analyzing information received by the receiver 702 and/or generating information for transmission by a transmitter 716, a processor that controls one or more components of the access terminal 700, and/or a processor that both analyzes information received by the receiver 702, generates information for transmission by the transmitter 716, and controls one or more components of the access terminal 700.

The access terminal 700 may additionally include memory 708 that is operatively coupled to the processor 706 and that can store data to be transmitted (e.g., high priority data), received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

The receiver 702 can further be operatively coupled to a controller 710 that can control uplink power for a plurality of uplink carriers by decoding power control commands for the plurality of carriers, and distributing power among the plurality of carriers based on the power control commands. The controller can further control the acquisition and storage in memory 708 of the power control commands, and direct communications with the base station by interfacing with transmitter 714 via the processor 706, as discussed with reference to FIG. 1. The access terminal 700 still further comprises a modulator 712 that modulates and transmits signals via transmitter 714 to, for instance, a base station, a web/internet access point name (APN), and another access terminal, etc. Although depicted as being separate from the processor 706, it is to be appreciated that the controller 710, demodulators 704, and/or modulator 712 can be part of the processor 706 or multiple processors (not shown). Furthermore, the functions of the controller 710 may be integrated in an application layer, a data stack, an HTTP stack, at the operating system (OS) level, in an internet browser application, or in an application specific integrated circuit (ASIC).

Figure 8:
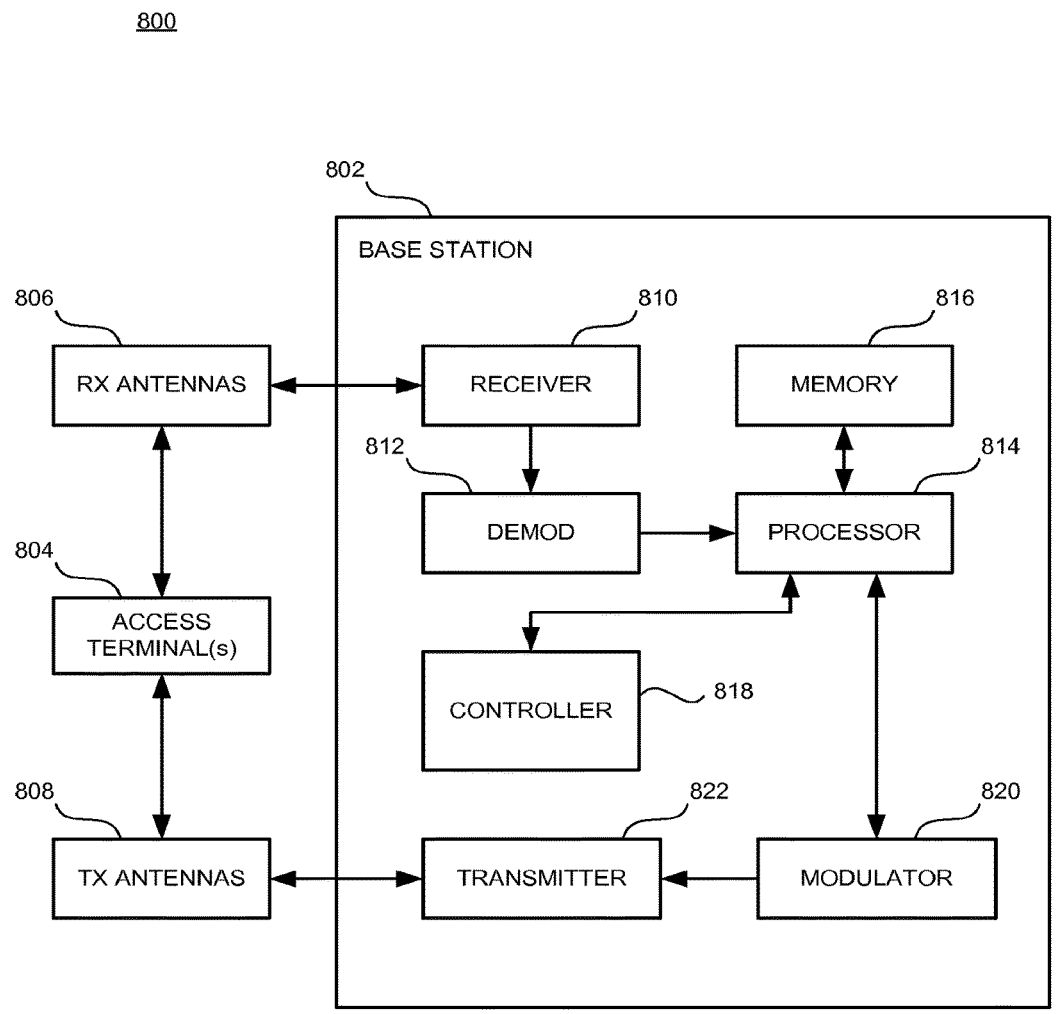
FIG. 8 is a block diagram of an example base station that facilitates uplink power control in a multicarrier communications system.

FIG. 8 is an illustration of a system 800 that controls feedback in an asymmetric multicarrier communications system. The system 800 comprises a base station 802 (e.g., access point, femtocell, etc.) with a receiver 810 that receives signal(s) from one or more access terminals 804 through a plurality of receive antennas 806, and a transmitter 824 that transmits to the one or more access terminals 804 through a transmit antenna 808. Receiver 810 can receive information from receive antennas 806 and is operatively associated with a demodulator 812 that demodulates received information. Demodulated symbols are analyzed by a processor 814 that can perform some or all functions for the base station 808 described above with regard to FIG. 1, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a controller 818 that can control uplink power on a plurality of uplink carriers by determining the power required for the plurality of carriers, and generating power control commands for the plurality of carriers based on the determination. Although depicted as being separate from the processor 814, it is to be appreciated that the controller 818, demodulator 812, and/or modulator 820 can be part of the processor 814 or multiple processors (not shown).

Figure 9:
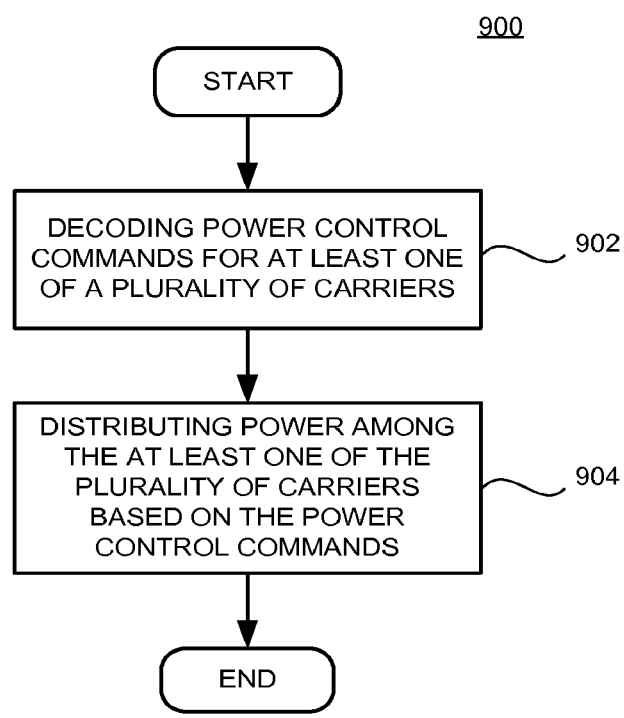
FIG. 9 is a flow chart illustrating an example of a process for uplink power control in a multicarrier communications system from an access terminal perspective.

FIG. 9 is a flow chart illustrating an example of a process for uplink power control in a multicarrier communications system. The process may be implemented in the access terminals 120 of system 100. As shown in FIG. 9, in block 902, power control commands may be decoded for at least one of a plurality of carriers, and the process may proceed to block 904. For example, the access terminal 120 may receive a power control commands from base station 110 on a single downlink carrier, and decode the power control commands.

In block 904, power among the at least one of the plurality of carriers may be distributed based on the power control commands, and the process may end. For example, the access terminal 120 may distribute and/or adjust the power among the plurality of carriers according to the power control commands received from the base station 110.

Figure 10:
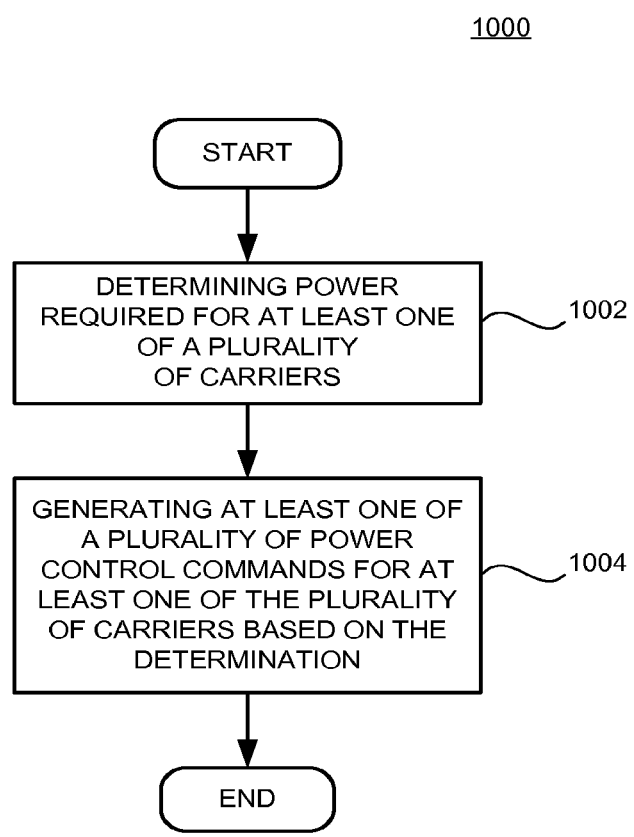
FIG. 10 is a flow chart illustrating an example of a process for uplink power control in a multicarrier communications system from a base station perspective.

FIG. 10 is a flow chart illustrating an example of a process for uplink power control in a multicarrier communications system. The process may be implemented in the base station 110 of system 100. As shown in FIG. 10, in block 1002, power required for at least one of a plurality of carriers may be determined, and the process may proceed to block 1004. For example, the base station 110 may receive a power headroom report from access terminal 120, and based on the headroom report determine the power required for the plurality of uplink carriers.

In block 1004, at least one of a plurality of power control commands for the at least one of the plurality of carriers may be generated based on the determination, and the process may end. For example, the base station 110 may generate and transmit power control commands for the plurality of uplink carriers to the access terminal 120 based on the power requirements of the access terminal 120.

Figure 11:
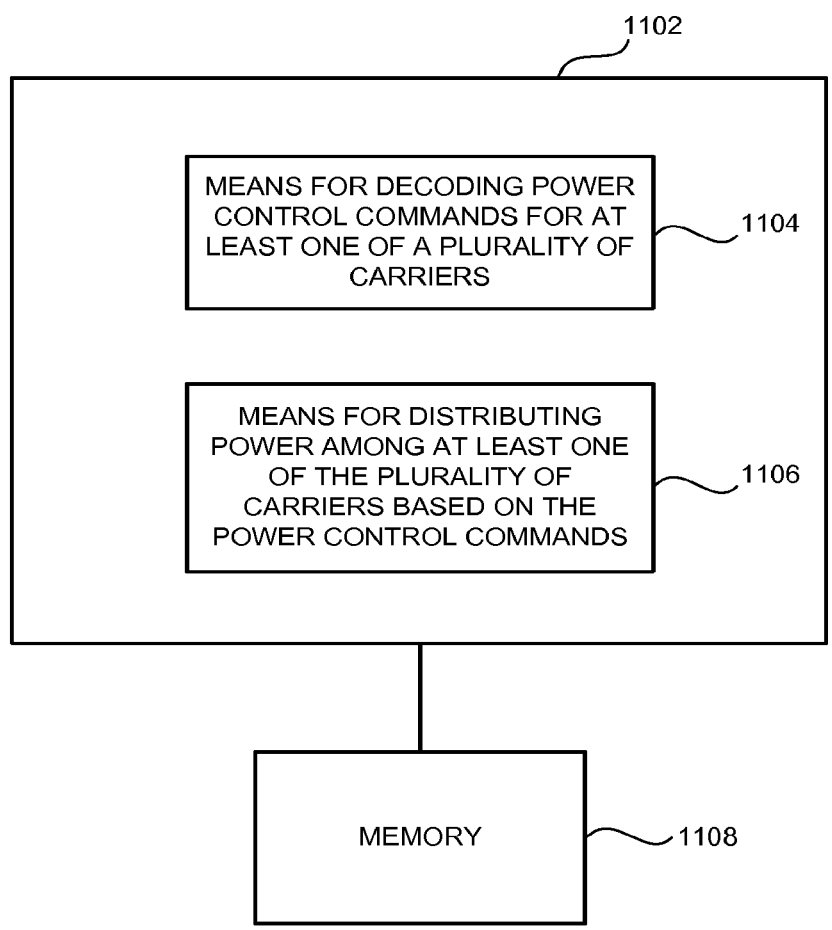
FIG. 11 is an illustration of an example system that facilitates uplink power control in a multicarrier communications system.

FIG. 11 is an illustration of an example system 1100 that facilitates uplink power control in a multicarrier communications system. For example, system 1100 can reside at least partially within an access terminal, etc. It is to be appreciated that system 1100 is represented as including functional blocks, which can be functional blocks that represent functions implemented by a processor, software, or combination thereof (e.g., firmware). System 1100 includes a logical grouping 1102 of means that can act in conjunction. For instance, logical grouping 1102 can include: means for decoding power control commands for at least one of a plurality of carriers 1104; and means for distributing power among the at least one of the plurality of carriers based on the power control commands 1106. Additionally, system 1100 can include a memory 1108 that retains instructions for executing functions associated with the means 1104 through 1106. While shown as being external to memory 1108, it is to be understood that one or more of the means 1104 through 1106 can exist within memory 1108.

Figure 12:
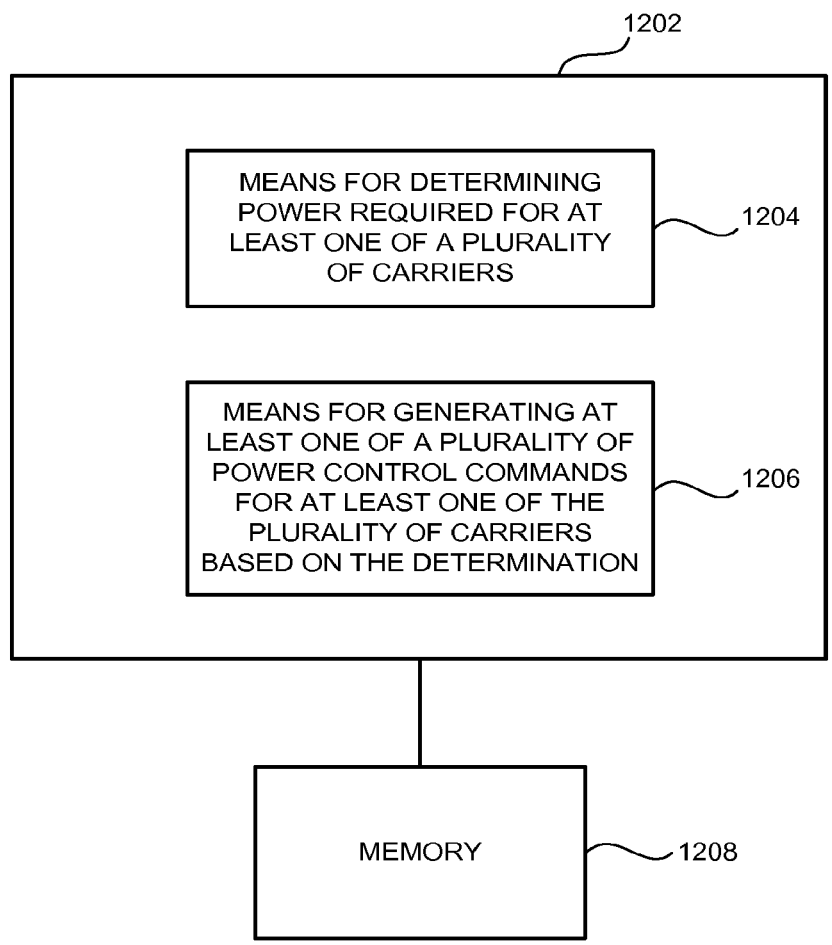
FIG. 12 is an illustration of an example system that facilitates uplink power control in a multicarrier communications system.

FIG. 12 is an illustration of an example system 1200 that facilitates uplink power control in a multicarrier communications system. For example, system 1200 can reside at least partially within a base station, etc. It is to be appreciated that system 1200 is represented as including functional blocks, which can be functional blocks that represent functions implemented by a processor, software, or combination thereof (e.g., firmware). System 1200 includes a logical grouping 1202 of means that can act in conjunction. For instance, logical grouping 1202 can include: means for determining power required for at least one of a plurality of carriers 1204; and means for generating at least one of a plurality of power control commands for at least one of the plurality of carriers based on the determination 1206. Additionally, system 1200 can include a memory 1208 that retains instructions for executing functions associated with the means 1204 through 1206. While shown as being external to memory 1208, it is to be understood that one or more of the means 1204 through 1206 can exist within memory 1208.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for wireless communication, comprising:
   receiving, by a user equipment (UE), a flag indicating that a scheduling grant comprising a power control command for an uplink carrier of a plurality of uplink carriers configured for the UE is to be transmitted on one of either a first downlink carrier paired with the uplink carrier or an anchor carrier that is not paired with the uplink carrier;
   receiving the power control command for the uplink carrier as part of the scheduling grant based on the received flag; and
   adjusting a transmission power of the UE for a transmission on the uplink carrier based on the power control command.

2. The method of claim 1, further comprising:
   determining the transmission power for the transmission on a physical uplink shared channel (PUSCH) of the uplink carrier based on the received power control command.

3. The method of claim 2, wherein determining the transmission power comprises fulfilling physical uplink control channel (PUCCH) power requirements before PUSCH power requirements of the uplink carrier.

4. The method of claim 1, further comprising:
   receiving a connection setup message comprising an indication that the first downlink carrier is paired with the uplink carrier.

5. The method of claim 1, wherein adjusting the transmission power comprises distributing power among the plurality of carriers based on the received power control command.

6. The method of claim 1, wherein the power control command comprises a plurality of power control commands for the plurality of uplink carriers.

7. The method of claim 6, wherein the plurality of power control commands are received on one carrier.

8. The method of claim 1, wherein the power control command is for the plurality of uplink carriers.

9. The method of claim 1, further comprising:
   receiving an overload indicator indicating an overload of the uplink carrier on the first downlink carrier that is paired with the uplink carrier.

10. The method of claim 1, further comprising:
    receiving an overload indicator indicating an overload of the uplink carrier on the anchor carrier irrespective of carrier pairing.

11. The method of claim 1, further comprising:
    prioritizing power distribution among the plurality of carriers based on a carrier priority of each one of the plurality of carriers.

12. The method of claim 11, wherein an uplink anchor carrier has higher carrier priority than other uplink carriers in the plurality of uplink carriers.

13. The method of claim 11, further comprising:
    receiving a prioritization list indicating the carrier priority for the plurality of carriers.

14. The method of claim 1, further comprising:
prioritizing power distribution among the plurality of uplink carriers based on a channel priority of each one of the plurality of uplink carriers.

15. The method of claim 14, wherein the channel priority of each one of the plurality of uplink carriers is determined based on whether control data is transmitted across a channel of a respective one of the plurality of uplink carriers.

16. The method of claim 1, further comprising:
receiving at least one weighting parameter for weighting path loss estimates in performing power control for the uplink carrier of the plurality of uplink carriers.

17. The method of claim 1, wherein the flag indicating that the scheduling grant for the uplink carrier is to be transmitted on either the first downlink carrier or the anchor carrier is received via radio resource control (RRC) signaling.

18. The method of claim 1, wherein the scheduling grant comprises an uplink grant comprising the power control command for an uplink data channel of the uplink carrier.

19. The method of claim 1, wherein the scheduling grant comprises a downlink grant comprising the power control command for an uplink control channel of the uplink carrier.

20. An apparatus comprising:
means for receiving, by a user equipment (UE), a flag indicating that a scheduling grant comprising a power control command for an uplink carrier of a plurality of uplink carriers configured for the UE is to be transmitted on one of either a first downlink carrier paired with the uplink carrier or an anchor carrier that is not paired with the uplink carrier;
means for receiving the power control command for the uplink carrier as part of the scheduling grant based on the received flag; and
means for adjusting a transmission power of the UE for a transmission on the uplink carrier based on the power control command.

21. The apparatus of claim 20, further comprising:
means for determining the transmission power for the transmission on a physical uplink shared channel (PUSCH) of the uplink carrier based on the received power control command.

22. The apparatus of claim 20, further comprising:
means for distributing power among the plurality of carriers based on the received power control command.

23. The apparatus of claim 20, further comprising:
means for receiving an overload indicator indicating an overload of the uplink carrier on the first downlink carrier that is paired with the uplink carrier.

24. The apparatus of claim 20, further comprising:
means for prioritizing power distribution among the plurality of carriers based on a carrier priority of each one of the plurality of carriers.

25. A computer program product, comprising a non-transitory computer-readable medium, the non-transitory computer-readable medium comprising:
code for receiving, by a user equipment (UE), a flag indicating that a scheduling grant comprising a power control command for an uplink carrier of a plurality of uplink carriers configured for the UE is to be transmitted on one of either a first downlink carrier paired with the uplink carrier or an anchor carrier that is not paired with the uplink carrier;
code for receiving the power control command for the uplink carrier as part of the scheduling grant based on the received flag; and
code for adjusting a transmission power of the UE for a transmission on the uplink carrier based on the power control command.

26. The computer program product of claim 25, further comprising:
code for determining the transmission power for the transmission on a physical uplink shared channel (PUSCH) of the uplink carrier based on the received power control command.

27. The computer program product of claim 25, further comprising:
code for distributing power among the plurality of carriers based on the received power control command.

28. The computer program product of claim 25, further comprising:
code for receiving an overload indicator indicating an overload of the uplink carrier on the first downlink carrier that is paired with the uplink carrier.

29. The computer program product of claim 25, further comprising:
code for prioritizing power distribution among the plurality of carriers based on a carrier priority of each one of the plurality of carriers.

30. A wireless communication apparatus, comprising:
a processor;
a memory storing instructions, the instructions executable by the processor to:
receive, by a user equipment (UE), a flag indicating that a scheduling grant comprising a power control command for an uplink carrier of a plurality of uplink carriers configured for the UE is to be transmitted on one of either a first downlink carrier paired with the uplink carrier or an anchor carrier that is not paired with the uplink carrier;
receive the power control command for the uplink carrier as part of the scheduling grant based on the received flag; and
adjust a transmission power of the UE for a transmission on the uplink carrier based on the power control command.

* * * * *